No. 717,180. Patented Dec. 30, 1902.
C. S. EMMERT.
COMBINED DAUBER AND STOPPER FOR LIQUID DRESSING BOTTLES.
(Application filed June 9, 1902.)
(No Model.)
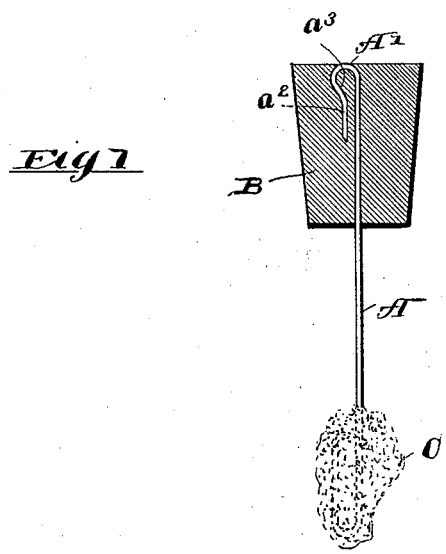
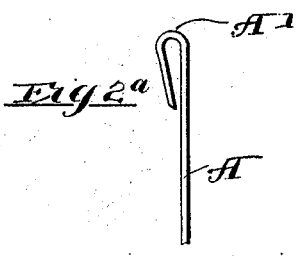
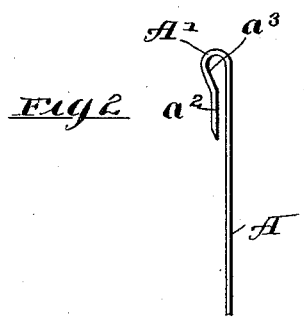
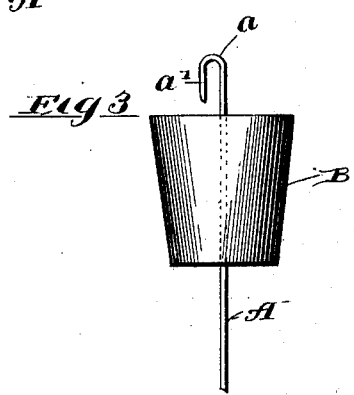
Witnesses:
Carl S. Crawford
William H. Hall
Inventor:
Charles S. Emmert
by Poole & Brown
his Attorneys

UNITED STATES PATENT OFFICE.

CHARLES S. EMMERT, OF CHICAGO, ILLINOIS.

COMBINED DAUBER AND STOPPER FOR LIQUID-DRESSING BOTTLES.

SPECIFICATION forming part of Letters Patent No. 717,180, dated December 30, 1902.

Application filed June 9, 1902. Serial No. 110,708. (No model.)

*To all whom it may concern:*

Be it known that I, CHARLES S. EMMERT, of Chicago, in the county of Cook and State of Illinois, have invented certain new and useful Improvements in a Combined Dauber and Stopper for Liquid-Dressing Bottles; and I do hereby declare that the following is a full, clear, and exact description thereof, reference being had to the accompanying drawings, and to the letters of reference marked thereon, which form a part of this specification.

This invention relates to improvements in combined daubers and stoppers for liquid-dressing bottles, and refers more specifically to means for attaching the shank of a dauber to the cork stopper.

The object of the invention is to provide an improved connection between the dauber-shank and the stopper, whereby said shank is securely fixed in the stopper and does not tend to shift endwise therethrough when pressure is applied to the said shank.

The invention consists in the matters hereinafter set forth and more particularly pointed out in the appended claims.

In the drawings, Figure 1 is a side elevation of a combined dauber and stopper, showing the shank attached to the stopper in accordance with my invention. Fig. 2 illustrates the outer end of the shank removed from the stopper. Fig. 2ª shows a modified form of the shank-hook. Fig. 3 illustrates a bottle-stopper, the outer end of the shank of a dauber showing the device heretofore employed for attaching the shank of the dauber to the stopper.

As shown in said drawings, A indicates the shank of the dauber, B the cork stopper to which the shank is attached, and C the dauber, made of a suitable compressible absorbent material, such as sponge, the shank A being formed at its end remote from the stopper to provide a loop which receives and confines said dauber.

Heretofore it has been the practice in attaching the dauber-shank to the stopper to fold one end of the shank A upon itself in a manner to form a hook $a$ and to pass the shank through the stopper before the dauber-retaining loop has been formed thereon, the outer end $a'$ of the hook being parallel with the shank. Said hook acts to limit the inward movement of the shank through the stopper and being embedded in the stopper prevents the shank turning therein. Said prior construction, however, provides no means for positively preventing the shank shifting endwise outwardly through the stopper when endwise pressure is applied to said shank, as when the dauber is being forced into the mouth of the bottle or during the use of the dauber in applying liquid dressing or other material for which the dauber is designed to apply. As a result much inconvenience is experienced in the use of combined daubers and stoppers as heretofore made to keep the shank properly fixed in the stopper. In order to prevent such endwise displacement of the shank in the stopper, I propose to so form the wire which engages the stopper as to provide thereon an outwardly-facing shoulder which when the hook is embedded in the stopper constitutes a stop which acts to hold the shank from shifting outwardly through the stopper.

As shown in Figs. 1 and 2, the shank A is bent upon itself to form a hook A', the outer or closed part of which is made somewhat larger than the similar hooks of previous constructions. The free end of said hook is turned inwardly toward the body of the shank, with the extreme end $a^2$ thereof lying parallel, or substantially so, with the shank A. Said extreme parallel outer end of the hook is joined with the curved portion thereof by means of an inclined or oblique part $a^3$, which constitutes an oblique or inclined outwardly-facing shoulder. In assembling the parts the shank A is inserted into and through the stopper in the usual manner before the dauber-retaining loop is formed therein, and the hook A' is forced downwardly into and embedded in the yielding cork constituting the stopper. When the said shank and hook are thus fitted to the stopper, the yielding character of the cork causes the same to closely invest the straight and inclined parts $a'$ $a^2$ of the hook, and the inclined portion $a^3$ constitutes a stop or shoulder which affords an effectual resistance to the outward shifting of the shank in the stopper.

The extremity of the hook A' may in some instances be straight and inclined from the curved portion thereof toward the shank, as shown in Fig. 2ª. In this instance the oblique shoulder of the hook is somewhat longer than that shown in Fig. 2.

In both constructions shown in Figs. 2 and 2ª the inclination of the end of the hook A' tends to hold the said end of the hook close to the shank when the hook is inserted into the cork stopper and prevents said end from being turned laterally away from the shank and to pierce the side face of the cork, so as to come into contact with the bottle-neck when the stopper is inserted into the bottle.

In the prior constructions shown in Fig. 3 the hooks a are frequently through careless workmanship made with the end a' thereof turned or inclined outwardly from the shank, so that when the hook is inserted into the cork said end is forced laterally outwardly through the side face of the cork. This prevents proper sealing contact of the cork with the bottle-neck, with the result of leakage between the stopper and the bottle-neck.

The combined stopper and dauber described may be employed for other uses than applying liquid dressing—as, for instance, it may be used for mucilage-bottles and for other like purposes.

I claim as my invention—

1. The combination with a cork stopper, of a dauber-shank, one end of which is bent upon itself to form a hook, the extreme end of said hook being made straight to permit it to be thrust into the cork, and the hook being formed to provide an outwardly-facing shoulder which acts to prevent endwise shifting of the shank in said stopper.

2. The combination with a bottle-stopper, of a dauber-shank which extends through said stopper, and is provided with a hooked end embedded in the stopper, the extremity of said hook being disposed generally parallel with the shank, and said extremity being joined to the curved portion of the hook by means of an oblique part which constitutes a shoulder which prevents the shank shifting endwise outwardly with respect to the stopper.

In testimony that I claim the foregoing as my invention I affix my signature, in presence of two witnesses, this 6th day of June, A. D. 1902.

CHARLES S. EMMERT.

Witnesses:
WILLIAM L. HALL,
GERTRUDE BRYCE.